(12) United States Patent
Walker

(10) Patent No.: US 7,254,892 B2
(45) Date of Patent: Aug. 14, 2007

(54) SUPPORT MECHANISM FOR A RECIPROCATING TOOL

(75) Inventor: Andrew Walker, Newton Hall (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/693,440

(22) Filed: Oct. 24, 2003

(65) Prior Publication Data

US 2004/0128843 A1 Jul. 8, 2004

(30) Foreign Application Priority Data

Oct. 28, 2002 (GB) .............................. 0225010.8

(51) Int. Cl.
*B27B 11/02* (2006.01)
*B23D 49/16* (2006.01)

(52) U.S. Cl. ............................... 30/392; 30/393

(58) Field of Classification Search .......... 30/392–394; 83/820, 824, 825, 812, 699.71, 699.41
See application file for complete search history.

(56) References Cited

U.S. PATENT DOCUMENTS

| | | | |
|---|---|---|---|
| 3,494,391 A | 2/1970 | Mango | |
| 3,665,983 A * | 5/1972 | Wagner et al. | 30/392 |
| 3,729,822 A | 5/1973 | Batson | |
| 4,021,914 A | 5/1977 | Leibundgut et al. | |
| 4,238,884 A * | 12/1980 | Walton, II | 30/393 |
| 4,262,420 A | 4/1981 | Nalley | |
| 4,283,855 A | 8/1981 | Nalley | |
| 4,351,112 A | 9/1982 | Nalley | |
| 4,512,078 A * | 4/1985 | Pfanzer | 30/393 |
| 4,545,123 A * | 10/1985 | Hartmann | 30/393 |
| 4,628,605 A * | 12/1986 | Clowers | 30/393 |
| 5,170,564 A | 12/1992 | Kaiser | |
| 5,644,846 A * | 7/1997 | Durr et al. | 30/393 |
| 5,765,463 A | 6/1998 | Okubo et al. | |
| 5,819,421 A * | 10/1998 | Giacometti et al. | 30/392 |
| 5,988,034 A | 11/1999 | Okubo et al. | |
| 6,131,498 A * | 10/2000 | Gerber | 83/647 |
| 6,230,411 B1 * | 5/2001 | Wall et al. | 30/376 |

* cited by examiner

*Primary Examiner*—Stephen Choi
(74) *Attorney, Agent, or Firm*—Harness, Dickey & Pierce, P.L.C.

(57) ABSTRACT

A support roller 15 for supporting a blade of a jigsaw having a scroller mode and a pendulum mode is disclosed. A roller support frame 18 supports the roller 15 and is mounted via a collar 32 to a drive shaft 10 of the jigsaw such that the blade support roller 15 rotates with the jigsaw blade as the drive shaft 10 is rotated in the scroller mode. The support frame 18 also pivots relative to the jigsaw housing to enable the blade support roller 15 to remain in contact with the jigsaw blade in the pendulum mode.

12 Claims, 3 Drawing Sheets

SUPPORT MECHANISM FOR A RECIPROCATING TOOL

The present invention relates to a support mechanism for a working member of a reciprocating tool and relates particularly, but not exclusively, to a support mechanism for a blade of a reciprocating jig saw. The invention also relates to a reciprocating jig saw incorporating such a support mechanism.

Jigsaws are power tools which comprise a linearly reciprocating saw blade for cutting a workpiece of wood or other material. Various types of jig saw mechanism are known, including so-called "scroller" jigsaws, which allow the saw blade to rotate relative to the body of the jig saw, and "pendulum" jigsaws, which allow oscillation of the saw blade relative to the saw body in a direction generally perpendicular to the direction of sawing motion. Scroller jigsawing is particularly useful when working in restricted spaces, in which the body of the jigsaw may come into contact with obstructions and limit the range of cutting angles available to the blade. Pendulum jigsawing increases the cutting force on the workpiece, and increases the cutting speed of the jigsaw. For example, U.S. Pat. No. 4,545,123 describes a jigsaw which can operate in either a scroller mode or a pendulum mode.

It is known to provide blade support rollers in prior art jigsaws, which contact the saw blade to provide lateral support thereto. However, know jigsaws suffer from the drawback that blade support rollers only contact the saw blade at limited scrolling and pendulum blade positions, as a result of which the support offered by the blade support roller is limited.

Preferred embodiments of the present invention seek to overcome the above disadvantage of the prior art.

According to an aspect of the present invention, there is provided a support apparatus for supporting a reciprocating working member of a tool, wherein the working member is adapted to execute reciprocating motion relative to a body of the tool, and the tool has a first mode in which the reciprocating working member is adapted to pivot relative to said body about a first axis substantially parallel to the direction of reciprocating motion of the working member, the apparatus comprising:

a support portion for engaging the reciprocating working member to provide a reaction force to said working member along a line of action of the tool;

characterised by a mounting portion rigidly connected to said supporting portion for mounting the apparatus relative to the working member to enable said support portion to remain in engagement with the working member during rotation thereof relative to the body about said first axis in the first mode.

By providing a support apparatus having a support portion adapted to remain in engagement with the working member during rotation thereof relative to the body in the first mode, this provides the advantage of additional support for the working member at each position thereof relative to the tool body. In the case of jigsaws, this provides the advantage of increasing the extent to which square cuts can be achieved at any scrolling angle.

According to another aspect of the present invention, there is provided a support apparatus for supporting a reciprocating working member of a tool, wherein the working member is adapted to execute reciprocating motion relative to a body of the tool, and the tool has a second mode in which the reciprocating working member is adapted to execute pivoting reciprocating motion relative to said body about a second axis transverse to the direction of reciprocating motion of the working member, the apparatus comprising:

a support portion for engaging the reciprocating working member to provide a reaction force to said working member along a line of action of the tool;

characterised by a mounting portion rigidly connected to said supporting portion for mounting the apparatus relative to the working member to enable said support portion to remain in engagement with the working member during pivoting reciprocating motion thereof relative to the body about said second axis in the second mode.

By providing a support apparatus having a support portion adapted to remain in engagement with the working member during pivoting reciprocating motion thereof relative to the body about said second axis in the second mode, this provides the advantage of additional support for the working member at each position thereof relative to the tool body. In the case of jigsaws, this provides the advantage of increasing the speed of cutting of the saw.

The support portion may be adapted to prevent movement of said working member in a direction transverse to a line of action of the tool.

This provides the advantage of minimising warping or buckling of the working member in the case of a flexible-working member. In the case of a jigsaw, this maximises the extent to which square cuts can be achieved.

The support portion may be adapted to engage the working member on both sides thereof in a direction transverse to a line of action of the tool.

The support portion may comprise at least one roller.

This provides the advantage that friction is reduced between the working member and the support portion.

The mounting portion may comprise a first part rigidly connected to said support portion, and a second part adapted to be connected to said working member and to undergo reciprocating movement relative to said first part.

In a preferred embodiment, said first part may further comprises an elongate aperture, and said second part further comprises an elongate bearing such that said elongate aperture slidably receives said bearing therein.

According to a further aspect of the present invention, there is provided a reciprocating tool comprising:

a body;

a motor having a rotary output shaft;

first drive means for converting rotary movement of said output shaft to reciprocating movement of a working member; and a support apparatus as defined above.

The tool may further comprise second drive means for converting rotary movement of said output shaft to pivoting reciprocating movement of said support apparatus about said second axis in said second mode.

This provides the advantage of enabling a single drive means such as a motor to synchronise pivotal reciprocating movement of the apparatus about the second axis with reciprocating movement of the working member relative to the tool body.

The second drive means may comprise cam means for pivotally displacing said support apparatus from a first position relative to said tool body.

The second drive means may further comprise biasing means for pivotally urging said support apparatus into said first position relative to said tool body.

The tool preferably comprises a jigsaw.

A preferred embodiment of the present invention will now be described, by way of example only and not in any limitative sense, with reference to the accompanying drawings in which.

Figure 1:
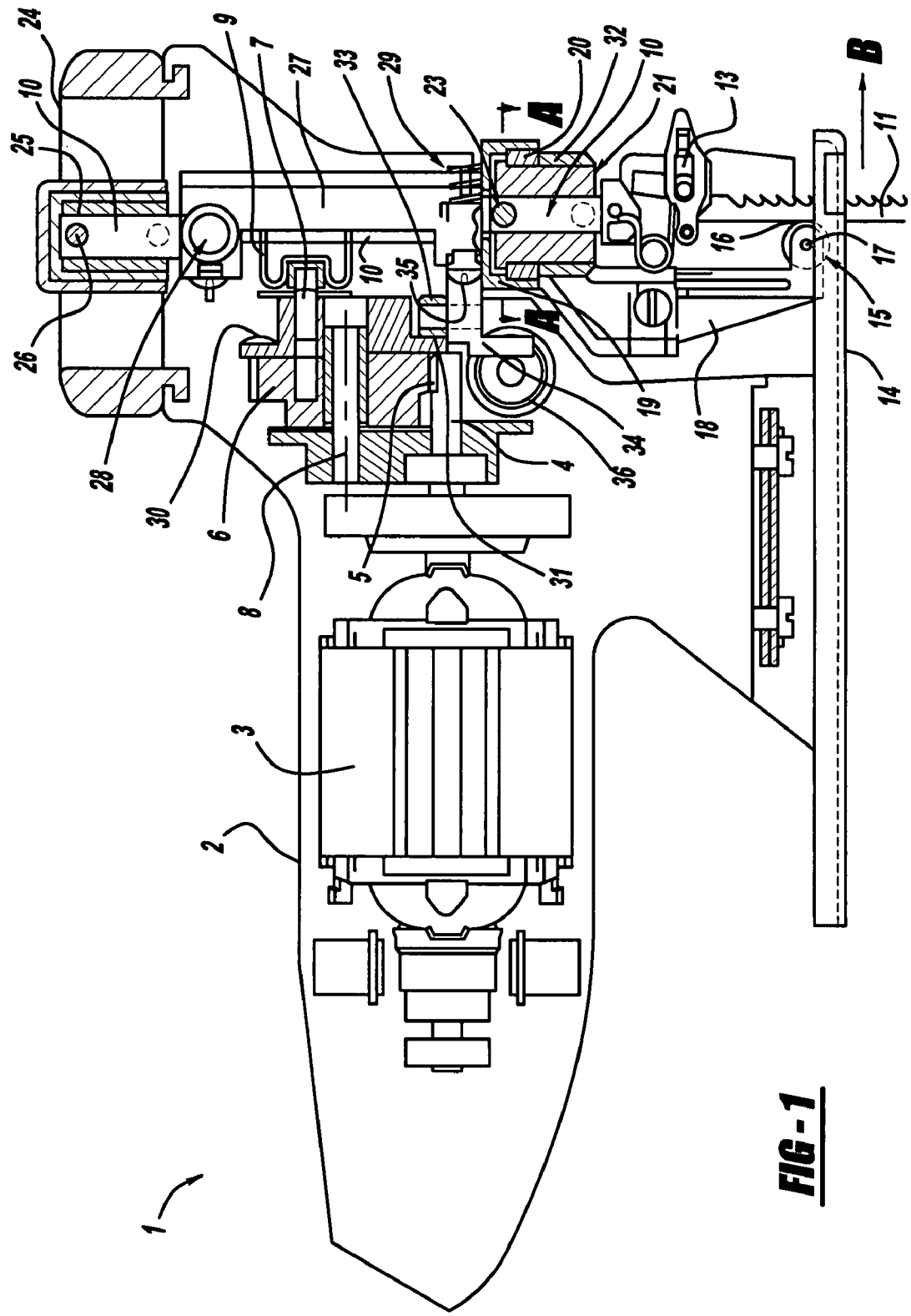
FIG. 1 is a cross-sectional side view of a hand-held jigsaw embodying the present invention.

Referring to FIG. 1, a hand-held jigsaw 1 has a housing 2 having a motor 3 disposed axially therein. The motor 3 has a rotary output shaft 4 having teeth 5 at its surface, the teeth 5 meshing with teeth on the circumference of an output gear 6. The output gear 6 carries an eccentrically mounted drive pin 7. Rotation of the output shaft 4 therefore causes rotation of output gear 6, which in turn causes circular motion of the drive pin 7 about an axis 8.

The eccentric drive pin 7 drives a conventional scotch yoke mechanism 9, the operation of which will be familiar to persons skilled in the art. The scotch yoke mechanism 9 converts circular motion of the drive pin 7 into linear reciprocating motion of a saw blade drive shaft 10 to cause linear reciprocating motion of a saw blade 11. The saw blade 11 is attached to the drive shaft 10 by a blade clamp 13.

A shoe 14 provides a reaction surface to rest on a workpiece to be cut (not shown). The saw blade 11 has teeth which are angled in such a way that the teeth cut the workpiece on an upward stroke of the blade 11 (against the reaction force provided by shoe 14), and loose material is cleared from the cut on the downward stroke, in a manner which will be familiar to persons skilled in the art. A blade support roller 15 having a circumferential groove therein contacts the saw blade 11 at 16 and provides support against rearward and lateral forces acting on the blade 11. The support roller 15 is rotably connected by a pin 17 to a roller support frame 18.

Figure 2:
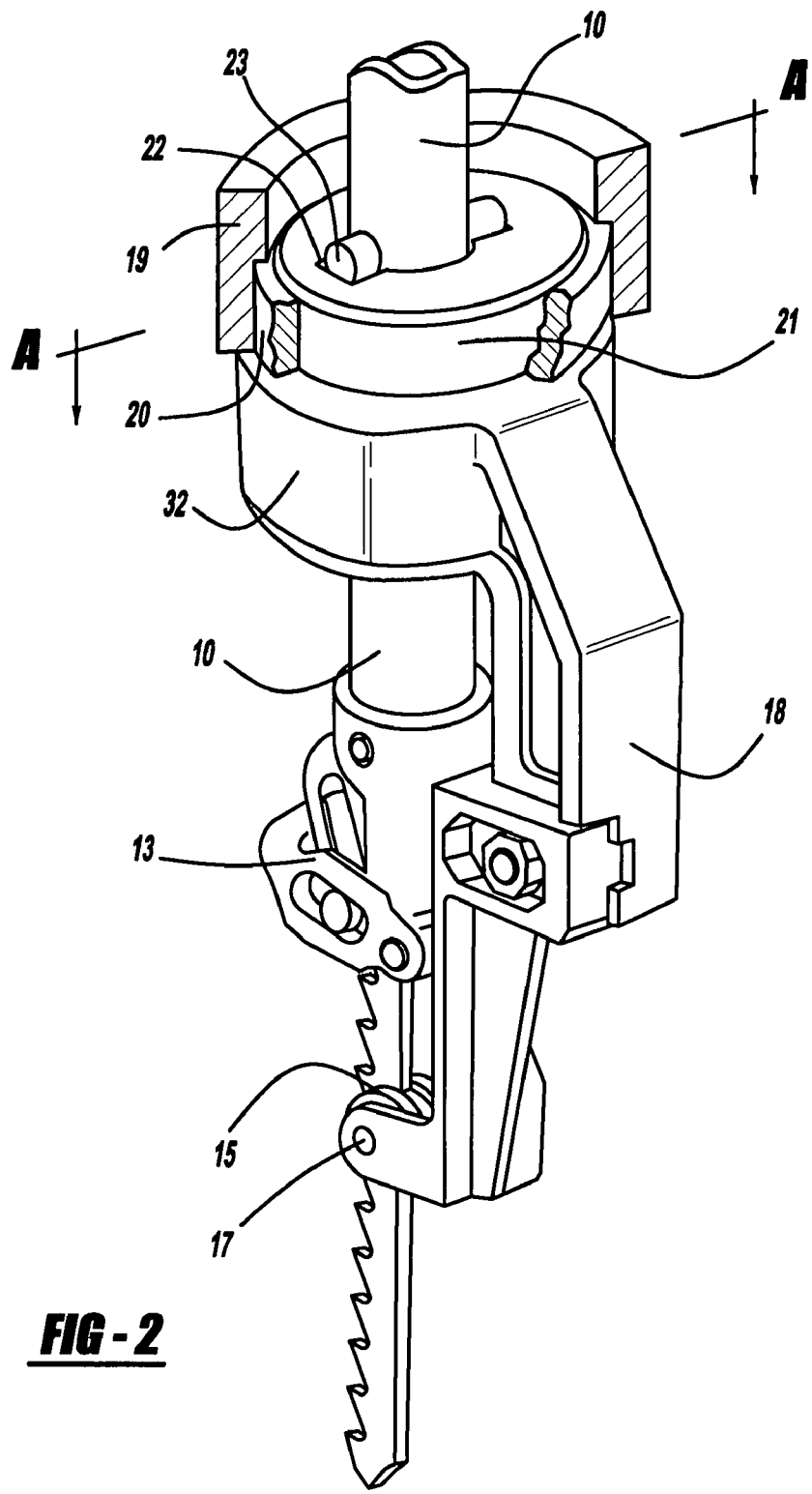
FIG. 2 is a perspective view of a saw blade and blade support mechanism of the jigsaw of FIG. 1.

Referring now to FIG. 2, the upper part of the roller support frame 18 mechanism comprises a bearing carriage 19 formed separately from the housing 2 of the saw 1. The bearing carriage 19 has an outer bush 20 rigidly mounted thereto which rotatably receives an inner bush 21. The inner bush 21 is rigidly connected to the roller support frame 18 by means of a circular collar 32.

Figure 3A:
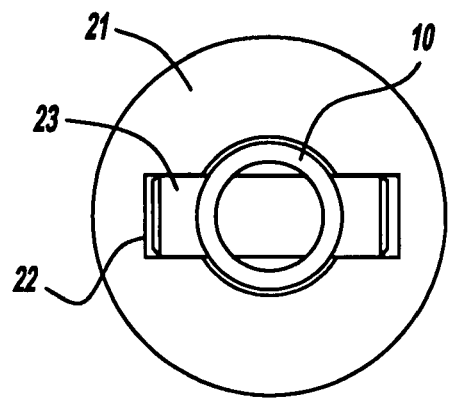
FIG. 3a is a view along the line A-A in FIG. 2.
Figure 3B:
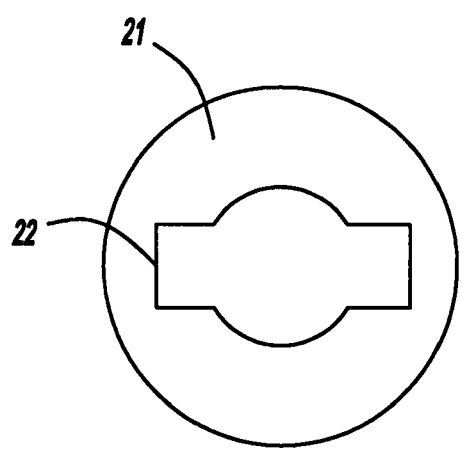
FIG. 3b is a view of the bush member of FIG. 3a with the shaft and steering pin removed.
Figure 3C:
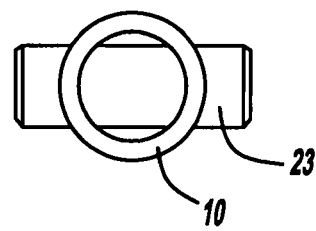
FIG. 3c is a view of the drive shaft and steering pin of FIG. 3a removed from the bush member.

In order to allow reciprocating motion of the drive shaft 10 in an up and down direction as shown in FIG. 2, a slot 22 extends axially through at least the inner bush 21 (FIGS. 3a, 3b and 3c), and is shaped to slidably receive the drive shaft 18. A steering pin 23 extends transversely through the drive shaft 10, such that when the drive shaft 10 is rotated, the steering pin 23 will engage slot 22 and rotate the inner bush 21 with the drive shaft 10. As bush member 21 is formed integrally with the roller support frame 18 and collar 32, rotation of the drive shaft 10 will cause corresponding rotation of the blade support roller 15 so that the roller 15 rotates with the blade 11 as the blade is rotated relative to the saw housing 2.

Referring again to FIG. 1, when the jigsaw 1 is operating in scroller mode as described above, the user can change the orientation of the blade 11, together with the blade support roller 15, by rotating knob 24 provided on the housing 2. The upper portion of the drive shaft 10 is slidably received in an aperture 25 in the inner portion of knob 24, and a further drive pin 26 (similar to drive pin 23) is transversely disposed in the upper portion of drive shaft 10. This drive pin 26 engages aperture 25 in the same manner as drive pin 23 engages slot 22 (FIG. 3a), such that the drive shaft 10 rotates with knob 24.

In order to enable operation of the jigsaw 1 pendulum mode, the whole of the blade support mechanism shown in FIG. 2 (i.e. including the drive shaft 10 and roller support frame 18) pivot as a single unit about point 28 relative to the housing. This enables the blade 11 and blade support roller 15 to pivot together in the direction of arrow B shown in FIG. 1. It is to be noted that for this to occur, the scroller mode must be disengaged and the blade must be facing forward in the "in-line" direction. A spring 29 (the purpose of which will be explained in greater detail below) urges the bearing carriage 19 towards the position shown in FIG. 1.

A cam surface 30 is formed on a front face of output gear 6 such that as the output gear 6 rotates, the cam surface 30 will come into contact with a roller 33 rigidly connected to a bracket 34 such that once per revolution of the output gear 6, the cam surface 30 will push the roller 33 and bracket 34 forwardly against the force of spring 29. The roller 33 is rigidly connected to bracket 34, which is in turn coupled to the bearing carriage 19. As a result, the whole of bearing carriage 19, drive shaft 10 and blade 11 are pivoted forwardly about point 28 in the direction of arrow B.

As the output gear 6 continues to rotate, the cam surface 30 is moved away from roller 33 and spring 29 is therefore able to push the bearing carriage 19, bracket 34 and roller 33 back to the position shown in FIG. 1. As a result, once per revolution of output gear 6, both the blade 11 and blade support roller 15 are reciprocated backwards and forwards in the plane of the blade 11, the blade support roller 15 remaining in contact with the blade 11 at all time during pendulum operation.

In order to disengage the pendulum action, a selector knob 36 can be rotated by the user. On rotation of the selector knob 36, bracket 34 is pushed forwardly thereby moving roller 33 out of contact with cam surface 30 and pushing the bearing carriage 19 forward against the action of spring 29. As the roller no longer abuts cam surface 30, the pendulum action is disabled.

It can be seen that the blade support roller 15 remains in contact with the blade at any scrolling angle, and during "in-line" pendulum operation, and that the scroller and pendulum modes are essentially independent of one another. This provides significant advantages over the prior art, in particular with regard to the squareness of cuts which can be achieved by the saw 1 in both scroller and pendulum modes.

The blade support roller 15 is mounted in roller support frame 18 which is slidably mounted and selectively fixed relative to collar 32 and blade 11 to accommodate a plurality of blade shapes and ensure the blade support roller 15 is in contact with said blade before operation of the tool.

It will be appreciated by persons skilled in the art that the above embodiment has been described by way of example only and not in any limitative sense, and that various alterations and modifications are possible without departure from the scope of the invention as defined by the appended claims.

The invention claimed is:

1. A jigsaw comprising:
   a housing;
   a motor in said housing;
   a reciprocating working member coupled with said motor, said reciprocating working member executing reciprocating motion relative to said housing, said reciprocating working member including a cutting blade;

said jigsaw has a mode in which the reciprocating working member rotates relative to said housing about an axis substantially parallel to the direction of reciprocating motion of the working member;

a support apparatus for supporting said reciprocating working member, said support apparatus including a support engaging the cutting blade to provide a reaction force to said cutting blade along a line of action of the tool and said reaction force being substantially in line with the line of action;

a mount rigidly mounted with said housing, and said mount including a bearing bushing rigidly connected to said support for mounting the apparatus with the working member to enable said support to remain in engagement with the working member during rotation thereof relative to the body about said axis, said support and mount positioned outside of the jigsaw housing.

2. A jigsaw comprising:

a housing;

a motor in said housing;

a reciprocating working member coupled with said motor, said reciprocating working member executing reciprocating motion relative to said housing, said reciprocating working member including a cutting blade;

said jigsaw has a mode in which the reciprocating working member executes pivoting reciprocating motion relative to said housing about an axis transverse to the direction of reciprocating motion of the working member;

a support apparatus for supporting said reciprocating working member, said support apparatus including a support engaging the cutting blade to provide a reaction force to said cutting blade along a line of action of the tool and said reaction force being substantially in line with the line of action;

a mount rigidly mounted with said housing, and said mount including a bearing bushing rigidly connected to said support for mounting the apparatus with the working member to enable said support to remain in engagement with the working member during pivoting reciprocating motion thereof relative to the body of said axis, said support and mount positioned outside of the jigsaw housing.

3. A jigsaw comprising:

a housing;

a motor in said housing;

a working member including a blade which is reciprocated relative to said housing, said jigsaw having a first operating mode in which said working member can be rotated relative to said housing about a first axis substantially parallel to the direction of reciprocating motion of the working member, and said jigsaw having a second operating mode in which said working member can execute pivoting reciprocating motion relative to said housing about a second axis which is transverse to the direction of reciprocating motion of the working member;

a support engaging the blade to provide a reaction force to said blade along a line of action of the jigsaw and said reaction force being substantially in line with the line of action;

a mount rigidly mounted with said housing, and said mount including a bearing bushing rigidly connected to said support for mounting the support with the working member to enable said support to remain in engagement with the working member during both said first and second operating modes, said support and mount outside of said jigsaw housing.

4. The jigsaw as recited in claim 3, wherein said support prevents movement of said working member in a direction transverse to a line of action of the working member.

5. The jigsaw as recited in claim 4, wherein said support engages the working member on both sides thereof in a direction transverse to a line of action of the working member.

6. The jigsaw as recited in claim 3, wherein said support comprises at least one roller.

7. The jigsaw as recited in claim 3, wherein said mount comprises a first part rigidly connected to said support, and a second part adapted to be connected to said working member and to undergo reciprocating movement relative to said first part.

8. The jigsaw as recited in claim 7, wherein said first part further comprises an elongate aperture, and said second part further comprises an elongate bearing such that said elongate aperture slidably receives said bearing therein.

9. The jigsaw as recited in claim 3 further comprising:

said motor having a rotary output shaft; and first drive means for converting rotary movement of said output shaft to reciprocating movement of said working member.

10. The jigsaw as recited in claim 9, further comprising second drive means for converting rotary movement of said output shaft to pivoting reciprocating movement of said support about said second axis in said second operating mode.

11. The jigsaw as recited in claim 10, wherein said second drive means comprises cam means for pivotally displacing said support from a first position relative to said tool body.

12. The jigsaw as recited in claim 11, wherein said second drive means further comprises biasing means for pivotally urging said support into said first position relative to said jigsaw housing.

* * * * *